Jan. 10, 1933.  G. D. MALLORY  1,894,237
BREAKER STRIP
Filed May 31, 1930
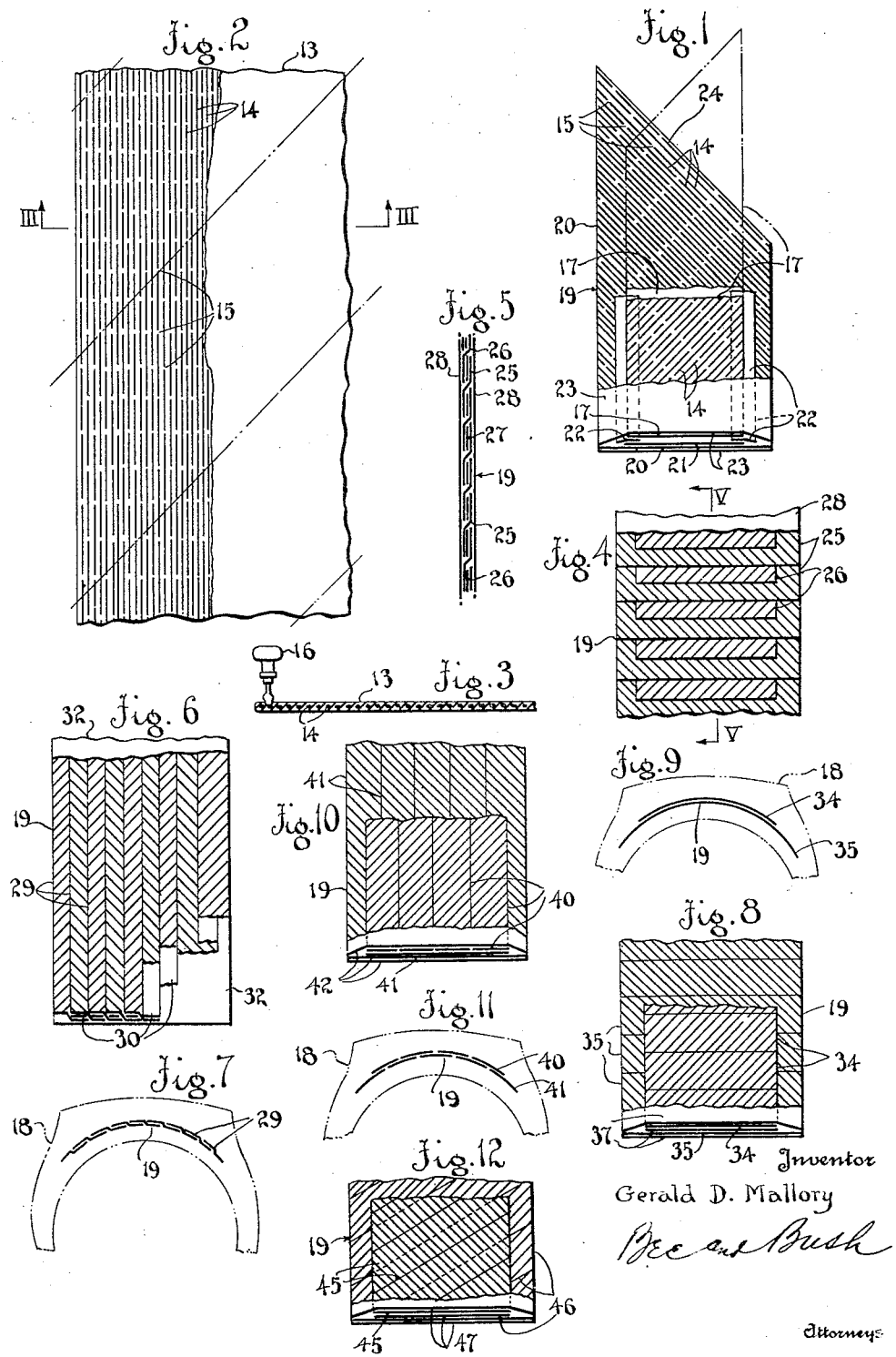
Inventor
Gerald D. Mallory
Bee and Bush
Attorneys Patented Jan. 10, 1933

1,894,237

UNITED STATES PATENT OFFICE

GERALD D. MALLORY, OF AKRON, OHIO, ASSIGNOR TO THE GOODYEAR TIRE & RUBBER COMPANY, OF AKRON, OHIO, A CORPORATION OF OHIO

BREAKER STRIP

Application filed May 31, 1930. Serial No. 458,785.

My invention relates to breaker strips for pneumatic tires, and it has particular relation to breaker strips which are formed of bias cut fabric.

One of the objects of the invention is to provide a relatively elastic and extensible breaker strip, the cords of which resist rupture and breaking to a much greater degree than the cords of breaker strips of ordinary construction. Other objects and advantages will be apparent as the description of the invention proceeds.

In the manufacture of pneumatic tires, it is customary to place a protective band of relatively narrow fabric, known as a breaker strip, upon a layer or strip of cushion rubber about the tread portion of the tire carcass. This band serves as a cushion to protect the fabric constituting the inner plies or carcass of the tire from severe local shocks, and it also serves to prevent separation of the rubber of the tread ply from the outer ply of fabric. In the larger sizes of tires, such as those employed upon trucks and busses, ordinarily these breaker strips comprise a plurality of plies (usually two) of bias cut cord fabric, between which is disposed an intermediate layer of cushioning gum for the purpose of permitting slight relative motion of the cords of one ply with respect to those of the other ply, without permitting a chafing action therebetween. In the assembly of the tires, a tread ply consisting of rubber compound is disposed upon the breaker strip, and the whole is subjected to vulcanization during which the rubber tends to flow and thus to encase, and to a certain extent, to impregnate the cords which constitute the breaker fabric. In this way the breaker and the tread ply are united into what constitutes substantially a monolithic or unitary whole, in which there can be but little or no relative movement between the outer fibers of the cord and the adjacent rubber compound. When tires so constructed are sharply flexed or indented in use, for example, by the action of stones or other relatively sharp objects, the cords immediately under the indentations are subjected to severe local strain which, because of the relatively inelastic and unyielding nature of the cords, is not transmitted to and shared by the adjacent cords. Likewise, this strain is not adequately transmitted to and shared by the relatively elastic yieldable rubber compounds in which the cords are encased. As a result, the cords in one locality are subjected to such severe tensional strain that local ruptures sometimes occur. Bruises caused in this manner greatly reduce the life and utility of the tires.

A breaker strip constructed according to my invention is composed of relatively short lengths of cord which have considerable movement with respect to each other, so that the shocks resulting from indentations of obstacles upon the road are transmitted to and shared by adjacent cords and also by the rubber in the tread ply. As a result, pneumatic tires embodying breaker strips of this character are much less subject to bruising than tire carcasses containing breaker strips of conventional construction.

Bor a better understanding of the invention, reference may now be had to the accompanying drawing, forming a part of this invention, of which:

Fig. 1 is a fragmentary diagrammatical plan view of a breaker strip embodying one form of the invention, the end portion of the strip being shown in cross-section for the sake of clearness;

Fig. 2 is a fragmentary plan view of a sheet of fabric employed in the construction of breaker strips, in accordance with the disclosure of Fig. 1;

Fig. 3 is a cross-sectional view taken substantially along the line III—III of Fig. 2 and illustrating one convenient method of cutting the cords in the fabric employed in constructing the breaker strip;

Fig. 4 is a fragmentary plan view of another form of breaker strip;

Fig. 5 is a fragmentary cross-sectional view taken substantially along the line V—V of Fig. 4;

Fig. 6 is a fragmentary plan view disclosing another form of breaker strip construction;

Fig. 7 is a fragmentary cross-sectional view of a tire carcass embodying a breaker strip constructed according to the disclosure of Fig. 6;

Fig. 8 is a fragmentary plan view of another form of breaker strip embodying the invention;

Fig. 9 is a fragmentary cross-sectional view of a tire carcass embodying a breaker strip constructed in accordance with the disclosure of Fig. 8;

Fig. 10 is a fragmentary plan view of a breaker strip embodying another form of the invention;

Fig. 11 is a fragmentary cross-sectional view of a tire carcass containing a breaker strip constructed in accordance with the disclosure in Fig. 10; and Fig. 12 is a fragmentary plan view of a breaker strip embodying still another form of the invention.

In the embodiment of the invention disclosed in Figs. 1, 2 and 3, a sheet of fabric 13 composed of cords 14 of conventional construction is provided. According to the method disclosed in these figures, the cords in this sheet are incised or cut at regular longitudinally spaced intervals, as indicated at 15, by means of a manually operated tool 16. It is to be understood that the invention is not limited to the use of manually operated devices, for in commercial practice any convenient type of automatic incising machinery may be employed. Preferably, the incisions in adjacent cords are disposed in staggered relation. However, it may be desirable, under some circumstances, to form the incisions of such length that a plurality of cords are severed along one cutting line. In this manner, the total number of incisions necessary to the proper preparation of the fabric can be materially reduced.

After the cords of the sheet of fabric have been properly incised, the fabric is cut upon a bias by means of any convenient mechanism, in accordance with conventional methods. Referring to Fig. 1, an outer ply 17 is superposed upon an inner ply 20 with the cords of one ply running transversely with respect to the cords of the other ply. The outer ply 17 is somewhat narrower than the inner ply, thus providing stepped marginal portions approximating a feather edge which is desirable in pneumatic tire construction. A layer of gum 21 is disposed between the two plies of fabric in order to prevent chafing of the cords of one ply upon those of the other. Also, relatively narrow strips of gum 22 are disposed immediately under the edge portions of the outer ply of fabric, whereby to provide an additional thickness of gum along this line. Layers of gum 23 are also disposed upon the outer surfaces of the fabric strips in order to insure adequate union between the surfaces of the breaker strip and a tire carcass 18, such as that shown by Figs. 7, 9 and 11. For the sake of convenience, a breaker strip 19 is represented by the same numeral in each of the Figs. 1 and 4 to 12 inclusive although the elements of the breaker in several of the figures are arranged differently and are assigned different numerals. In splicing breaker strips prepared in accordance with this method, conventional "fishtail" ends 24 are provided to insure a proper union. The strips so constructed are spliced to form bands and are then assembled into the tires 18 by means of conventional machinery and conventional methods.

In the embodiment of the invention disclosed in Figs. 4 and 5, the breaker strip 19 is formed of relatively narrow transversely disposed units or strips 25 and 26 of bias cut fabric, arranged in overlapping or shingled relation, the cords of each unit being disposed transversely with respect to those of adjacent units. In order to prevent chafing between the cords of the respective units and to insure adequate cushioning action of the breaker, a layer of gum 27 is disposed between the contiguous surfaces of each pair of overlapping extremities of the adjacent units.

In the operation of assembling the breaker strip, a layer of gum 27 is superposed upon each unit of fabric before the addition of the succeeding unit. In this manner uniformity as to the total thickness of gum in the breaker strip is insured. The width of the units of which the breaker is assembled may be varied as desired. However, for practical purposes, it is convenient to employ widths of approximately one and one half inches. The employment of materially lesser widths than this results in an excessive amount of labor in assembling the various units, whereas the employment of materially greater widths results in breaker strips having insufficient elasticity. As shown by Fig. 4, the shorter and longer units 25 and 26 are arranged in alternating relation in order to provide proper graduation of thickness toward the edge of the assembled construction.

The units 25 and 26 of fabric have an approximately 50 percent lap. By this construction, a breaker strip having at least two ply thickness at all points is obtained. However, if desired, this degree of lap may either be increased or decreased, in order to obtain greater or lesser thickness, as may be desired.

The final operation of assembling the breaker strip consists in adding inner and outer layers of gum 28 and then overlapping the end units upon each other to provide an endless band.

In the form of the invention shown by Figs. 6 and 7, relatively narrow units 29 of bias cut fabric are disposed in overlapped shingled relation with respect to each other, in substantially the arrangement disclosed in Fig. 5, except that the strips are disposed longitudinally rather than transversely with respect to the main body of the breaker strip 18. In this construction inner and outer layers of gum 32, similar to the layers 28 are employed. Also, narrow strips of gum 30, similar to the strips 27, are disposed between the units of fabric.

Another form of the invention shown by Figs. 8 and 9 comprises relatively narrow transversely disposed units 34 and 35 of bias cut fabric similar to those disclosed in connection with the embodiment of the invention disclosed in Fig. 4. However, these units, instead of being arranged in overlapped relation, are disposed side by side in two distinct plies with the edge portions of the units in one ply coinciding with the center lines of the units in the adjacent superposed ply. In this construction, the outer ply 34 is composed of relatively short units thereby providing stepped margins for the breaker. Breaker strips of this type are coated with layers of gum 37 that are disposed upon both sides and between the units 34 and 35.

In Figs. 10 and 11, a breaker strip 19 is disclosed in which narrow strips 40 and 41 are arranged in two distinct plies in substantially the same manner as those disclosed in Figs. 8 and 9, except that the strips run longitudinally rather than transversely with respect to the main body of the breaker strip. Layers of gum 42 separate and surround the strips 40 and 41. As shown in Fig. 12 it is also feasible to form the breaker strip 19 of relatively narrow units 45 and 46, which are disposed diagonally, or on a bias, with respect to the main body of the breaker and which are covered by plies of gum 47 in accordance with the previously described embodiments of the invention. The strips 45, as well as the strips 46, are so arranged as to have the edges in abutting relation. However, it is also practicable to employ a shingled arrangement similar to that disclosed in Figs. 4 and 5, if desired.

It is to be understood that in all of the embodiments of the invention disclosed, the cords of the inner ply of fabric are disposed transversely with respect to those of the outer ply. When breaker strips embodying the principles of this invention in which the cords are cut into relatively short lengths, are incorporated in vulcanized tires, any flexure of the latter results in slight movements of the lengths of cord with respect to each other, thus imparting a certain degree of elasticity or stretch to the breaker as a whole. The strains thus imposed upon the cords in a given area by flexure are transmitted to adjacent cords and also to a certain extent to the rubber of the tread element. In this way excessive local straining of the cords is prevented, and the liability of rupture or bruising is greatly decreased. For these reasons, the life of the tires is materially enhanced.

Although I have described in detail only the preferred embodiments of the invention, it will be apparent to those skilled in the art that it is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of forming breaker strips for pneumatic tires which comprises forming a plurality of relatively short transverse incisions in a strip of breaker strip fabric, having the cords thereof running longitudinally, said incisions being arranged in a pattern in such manner that all of the cords are cut into a relatively short length without excessive weakening of the fabric, subsequently cutting the fabric upon a bias and then applying the bias cut pieces one upon the other to form a multi-ply breaker strip band.

2. A method of forming breaker strips for pneumatic tires which comprises cutting a strip of fabric into relatively narrow bias cut strips, disposing a layer of gum upon the face of each strip, and subsequently arranging the strips in overlapping shingled relation with respect to each other, with the layer of gum disposed between the overlapped portions to form a continuous sheet of sufficient length to constitute a breaker strip band.

3. A breaker strip for pneumatic tires comprising two plies of cord fabric having the cords thereof cut upon a bias, the cords of one ply running transversely with respect to the cords of the other ply, the plies having relatively short transversely extending incisions formed therein, the incisions being arranged in a pattern in such manner that all of the cords are cut into relatively short lengths, but no two incisions are disposed contiguously to each other.

4. A breaker strip for a pneumatic tire carcass comprising a relatively large number of narrow strips of bias cut cord fabric, the strips being arranged in overlapped shingled relation with respect to each other, the cords of one strip being disposed transversely with respect to the cords of the contiguous strips.

5. A breaker strip for pneumatic tire carcasses comprising a relatively large number of comparatively narrow strips of bias cut fabric, the strips being arranged transversely with respect to the breaker strip in overlapped, shingled relation with respect to each other, the cords of each strip running transversely with respect to the cords of the adjacent strips.

6. A breaker strip for pneumatic tire carcasses comprising a relatively large number of comparatively narrow strips, the edges of the strips being arranged in abutting relation with respect to each other to form an inner and outer ply, the edges of the outer ply being arranged in staggered relation with respect to the edge portions of the adjacent strips, the strips being disposed transversely with respect to the breaker strip, a second ply of narrow strips disposed upon the first ply with the edge portions arranged in parallel but staggered relation with respect to the edge portions of the first ply.

7. A breaker strip for pneumatic tires comprising a plurality of narrow strips of bias cut fabric disposed longitudinally with respect to the breaker strip, with the cords of each strip running transversely with respect to the cords of the adjacent strip.

8. A breaker strip for pneumatic tires comprising a plurality of relatively narrow strips of bias cut fabric, the strips being disposed longitudinally of the breaker strip in overlapped shingled relation with respect to each other, the cords of each strip being disposed transversely with respect to the cords of the adjacent strip.

9. A breaker strip for pneumatic tires comprising a relatively large number of comparatively narrow strips disposed longitudinally with respect to the breaker strip and having their edge portions disposed in abutting relation with respect to each other, a second ply, the edge portions of the strips constituting the second ply being disposed in staggered relation with respect to the edge portions of the strips constituting the first ply, the cords of the strips constituting one ply being disposed transversely with respect to the cords in the strips constituting the other ply.

10. A breaker strip for pneumatic tire carcasses comprising an inner and outer ply of cord fabric, the plies being formed of bias cut material in which the cords are cut into relatively short lengths.

In witness whereof, I have hereunto signed my name.

Signed at Akron, in the county of Summit and State of Ohio, U. S. A., this 28th day of May, 1930.

GERALD D. MALLORY.